(12) United States Patent
Holland

(10) Patent No.: US 7,252,752 B2
(45) Date of Patent: Aug. 7, 2007

(54) METHOD AND APPARATUS FOR REMOVING CONTAMINANTS FROM CONDUITS AND FLUID COLUMNS

(76) Inventor: Herbert William Holland, 2314 Chimney Rock Rd., Houston, TX (US) 77056

( * ) Notice: Subject to any disclaimer, the term of this patent is extended or adjusted under 35 U.S.C. 154(b) by 0 days.

(21) Appl. No.: 11/391,612

(22) Filed: Mar. 27, 2006

(65) Prior Publication Data

US 2006/0175200 A1 Aug. 10, 2006

Related U.S. Application Data

(63) Continuation-in-part of application No. 10/945,318, filed on Sep. 20, 2004, now Pat. No. 7,018,522, which is a continuation of application No. 10/038,018, filed on Jan. 3, 2002, now Pat. No. 6,793,801.

(51) Int. Cl.
*C02F 1/461* (2006.01)
(52) U.S. Cl. .................. 205/742; 204/267; 204/269; 204/554; 204/557; 204/560; 204/571; 204/664; 204/672; 204/673; 205/756
(58) Field of Classification Search ............... 204/267, 204/269, 554, 557, 560, 571, 664, 672, 673; 205/742, 756, 757; 210/222, 223, 695, 748
See application file for complete search history.

(56) References Cited

U.S. PATENT DOCUMENTS

| | | | | |
|---|---|---|---|---|
| 3,892,640 A | * | 7/1975 | Furuta ........................ | 205/755 |
| 4,329,211 A | * | 5/1982 | Plantes et al. ............... | 205/755 |
| 5,679,257 A | * | 10/1997 | Coate et al. ................. | 210/695 |
| 5,958,205 A | * | 9/1999 | Ingalls et al. ............... | 204/664 |
| 6,096,179 A | * | 8/2000 | Fajt et al. .................... | 204/294 |
| 6,294,061 B1 | * | 9/2001 | Morkovsky et al. ......... | 204/242 |
| 6,309,532 B1 | * | 10/2001 | Tran et al. .................. | 205/687 |

* cited by examiner

*Primary Examiner*—Roy King
*Assistant Examiner*—William T. Leader

(57) ABSTRACT

A method and apparatus for contaminant separation utilizes an interleaved array of oppositely charged electrode plates for fluid treatment. Spacing between the parallel electrode plates is graduated so that the volume of the cavities between the opposing electrodes provides varying levels of treatment of a broad range of contaminants from a variety of fluid columns. A fluid flow path extending substantially orthogonal to the direction of the electrical field established between opposing electrode plates provides a feed stream with exposure to the varying levels of electrical charges between the electrode plates. The method and apparatus provide an effective means of contaminant separation by a device having a small footprint and requiring low amounts of electrical energy.

21 Claims, 6 Drawing Sheets

METHOD AND APPARATUS FOR REMOVING CONTAMINANTS FROM CONDUITS AND FLUID COLUMNS

This application is a continuation-in-part of application Ser. No. 10/945,318, filed on Sep. 20, 2004, now U.S. Pat. No. 7,018,522, which is a continuation of application Ser. No. 10/038,018, filed on Jan. 3, 2002, now U.S. Pat. No. 6,793,801.

BACKGROUND OF THE INVENTION

The present invention relates to extraction of scale, corrosion, deposits and contaminants from within conduits and on equipment utilized in the transmission of fluid columns, and further relates to the removal of contaminants that may accumulate within fluid columns transferred in such conduits.

It is common for contaminant deposits to accumulate within the inner walls of conduits and equipment utilized in the transportation and transmission of fluids from one location to another. In oilfield pipelines, for example, a mixture of oil, water and minerals may flow out of a well and through equipment used to separate the marketable oil from the water and other components of the fluid column. Paraffin, asphaltene and mineral scale deposits typically form in conduits used to transport this fluid mixture and restrict flow within the pipeline. These deposits and the associated congestion they create may further lead to the deterioration of pumps, valves, meters and other equipment utilized to propel and monitor the flow of the fluid through the pipeline system. Such deposits typically result in lost production and substantial expenditures for thermal, mechanical or chemical remediation to achieve and maintain full flow through a pipeline.

Many thermal exchange systems, such as cooling towers or boilers, utilize water as a heat transfer medium. Mineral scale and corrosion buildup within such systems can result in flow restrictions similar to those of oilfield pipelines. Deposits within the conduits of such systems typically restrict the flow of water through the system and adversely affect the operation of equipment such as pumps and valves.

Further, deposits within the walls of piping systems and on thermal exchange grids tend to act as a layer of insulation and inhibit the efficient transfer of heat carried by the water. Thus, contaminant deposits result in restricted flow, lost efficiency and increased energy consumption in these types of water treatment systems. Periodic descaling of heat exchange equipment typically results in process downtime and substantial labor and remediation expenditures.

In closed-loop systems where water is continuously circulated to facilitate heat transfer from one area of a system to another, chemical treatment of the water is commonly used to remove contaminant deposits and control algae, bacteria and other biological contaminants. Over time, the build-up of chemicals, minerals and other contaminants within a water column typically results in the continuously circulated water column being unfit for continued use. Chemical and contaminant laden water streams typically require additional treatment to render them suitable for discharge into a wastewater disposal system or for release into the environment. Chemical treatment is costly and increasingly gives rise to growing environmental concerns with the storage, handling and dispensing of dangerous chemicals.

These prior art methods of dealing with contaminants in fluid columns are costly, time consuming and in some instances pose harm to the environment. For these and other reasons the effectiveness of such methods ranges from marginal to unsatisfactory. One alternative to prior art methods has been magnetic treatment wherein the magnetic flux provided by a magnetic field generator is introduced to a contaminated fluid column. Magnetic treatment of fluid columns typically results in the reduction and elimination of scale and other deposits within conduits and on equipment utilized to propel a fluid through a system. Magnetic treatment may also be used to accelerate the separation of oil and water. Environmental regulations charge entities that generate contaminated fluid columns as part of a manufacturing process or an incidental spill or leak with the containment, treatment and elimination of pollutants from a fluid column prior to discharging the treated effluent into the environment. Numerous types of treatment systems are utilized in a variety of situations where discharge limits are of prime concern. Examples of contaminated fluid columns include water run-off from facility operations, industrial wastewater, oilfield production water and wastes associated with contaminated soil remediation.

Magnetic treatment may be utilized prior to passing a hydrocarbon-contaminated feedstock through an oil/water separation device to enhance the efficiency of the equipment in the removal of free-floating oil. However, while magnet treatment of a feed stream accelerates oil/water separation, contaminants such as suspended solids, typically remain within the fluid column. Thus, magnet treatment alone fails to address concerns faced by entities charged with the treatment of a fluid column prior to its discharge into the environment.

One method of contaminant separation may be accomplished by passing a contaminated feedstock between electrically energized electrodes to bond suspended and dissolved contaminants into larger particles to facilitate their extraction from the fluid column. For example, contaminant separation may be utilized to break oil/water emulsions, allowing the separated oil to be recovered from the water column. Contaminant separation may also be used to initiate the coalescing of many suspended and dissolved solids within a contaminated water column to accelerate the bonding of solid contaminants and enhance the water clarification process. While prior art contaminant separation devices may be of benefit in certain applications, they have a tendency to clog with solids carried within the feedstock. This typically interrupts the treatment process while the equipment is cleaned, creating delays in processing, substantial maintenance issues and other concerns. Further, prior art contaminant separation methods are typically limited in the range of feed stocks that may effectively be processed due to the equal and even spacing of the electrically energized electrodes within their reactors.

While the spacing of the electrodes in some prior art devices may be modified to achieve the desired results during the setup and initiation of treatment for a certain feedstock, changes in the composition of the feed stream typically result in undesired and substandard treatment of the modified feedstock. However, if the spacing of the electrodes within prior art devices is adjusted to treat a modified feed stream, undesired and substandard treatment typically results when the feedstock resumes its original composition.

There have been many attempts to improve prior art treatment methods. In many instances, the desirable treatment resulting from utilizing smaller laboratory reactors cannot be attained in field operations requiring larger flow rates. Many prior art devices utilizing reactor designs similar to that of the small laboratory reactors on a much larger scale in an attempt to achieve larger flow rates. However, merely increasing the size of the plates or lengthening an array of electrodes within a larger housing capable of larger flow rates fails to provide for similar treatment results attained with the smaller laboratory cells unless a proportional increase in the current and voltage supplied to the larger electrodes is provided. Therefore, an increase in the surface area of electrodes within a reactor without a proportional increase in amperage and voltage typically results in larger reactors failing to duplicate the treatment levels achieved by smaller reactors due to a proportional decrease in the number of electrons and metal ions per square inch dispersed into a fluid column relative to the increased flow rate of a feedstock through a reactor. However, providing increased amperage and voltage to larger cells of prior art devices typically results in deficiencies that include large power supply components requiring larger amounts of energy, electrical arching between electrode plates that leads to the pitting and uneven wear of electrode plates, an accelerated degradation of sacrificial electrodes and excessive heat generation.

Attempts by prior art devices to increase flow rates have typically resulted in a reduction in the types of contaminants that may be removed from a feedstock and a loss of efficiency when treating a broad range of fluid columns with the even spacing of electrodes typically found in such devices. Further, many prior art devices provide for the laminar flow of a feedstock through their electrodes. This typically reduces the exposure of a fluid column to the varying intensities of the electronic fields that may be found at varying distances from the electrode plates.

An additional deficiency of many prior art devices is the placement of their electrodes within a reactor housing so that substantial volumes of a feed stream pass between the outer electrode plates and the inner wall of a reactor, resulting in substantial amounts of the feedstock receiving little or no treatment. Further, prior art devices require a separate power supply for each array of electrodes formed from a particular electrically conductive material since differing levels of electrical voltage are typically required to control the reactions of the various metal electrodes with a fluid column. Multiple power supplies occupy additional space and require additional input power.

None of the attempts to improve prior art devices provide the benefits of the present invention. By departing from the prior art, the method and apparatus hereby disclosed provide a simple, effective means of retarding contaminant build up and removing existing deposits from the internal walls of conduits and the surfaces of equipment utilized in the transmission and storage of fluid columns. The method and apparatus disclosed herein provide for the variable spacing of electrodes, and arrays of electrodes comprised of dissimilar metals having distinct and variable surface area exposure, within a single readily accessible reactor housing that may be driven by a single power supply.

The instant invention may therefore be utilized in the treatment of a fluid column to facilitate extraction of contaminants from a feedstock for subsequent collection of the pollutants for disposal, reprocessing or recycling.

SUMMARY OF THE INVENTION

In the instant invention, a method and apparatus are provided for use in the extraction of deposits such as scale, corrosion, paraffin or asphaltene from within conduits utilized in the transmission of fluid columns by passing a feedstock through a magnetic field generator. By subjecting the feedstock to an intense magnetic field, dissolved substances tend to remain in suspension instead of being absorbed into ions that would typically result in adhesive deposits within conduits and on equipment utilized to transport the fluid. The magnetic field does not remove contaminants from the fluid column. Rather, it induces a similar charge to the elements carried within the fluid column and causes dissolved and suspended substances such as paraffin, asphaltene, silica or calcium to become non-adhesive, repel each other and remain in suspension instead of forming adhesive deposits.

This invention generally relates to the treatment of fluid columns with an emphasis on the prevention of contaminant deposition, the removal of deposits from the internal walls of conduits and the extraction of contaminants from a fluid column. Therefore, treatment of feedstocks with a magnetic field generator typically enhances the ability of a fluid to flow through conduits and equipment utilized in the storage, transportation and delivery of a fluid.

One such magnetic device may be comprised of layers of a continuous coil of wire disposed coaxially and radially spaced apart from one another, said coiled wire layers emanating outward from a fluid transmission conduit and having open-air ducts formed by a pattern of spacers disposed between layers of the uninterrupted coil of wire. This coaxial array of wire layers provides for cooling of the continuous wire coil by allowing air passing through the open-air cooling ducts to transfer heat generated by the electrically charged wire to the atmosphere. The open-air cooling of the device serves to reduce heat that is typically retained within other types of electromagnetic field generators. Further, air-cooling the device results in less resistance within the continuous coil of wire, allowing more current to flow through the wire coil. This increases the total amp turns, and therefore the magnetic flux, provided by the device.

Should a magnetically treated fluid column require remedial treatment to allow for its continued reuse or discharge into the environment, the feed stream may be further treated to extract a variety of dissolved and suspended contaminants from the fluid column. Contaminant separation may be accomplished by applying electric current and voltage to electrodes contacting a fluid column to provide a stable flocculate that may be readily removed from the feed stream.

Thus, treatment of fluid columns by a magnetic field generator may be useful in preventing and extracting contaminant deposits from within conduits and equipment utilized in the storage, transportation and delivery of fluid columns and on contaminant separation electrodes of the instant invention. When used in concert, magnetic treatment and the contaminant separation methods disclosed herein provide a synergy of treatment that significantly enhances the performance of systems utilized in the transportation, transmission or circulation of fluid columns.

The input of controlled electrical energy to a contaminated feedstock results in physical and chemical reactions that destabilize the contaminated fluid column and allow contaminants to change form, thereby accelerating their removal from the feed stream. Various treatments delivered to a feedstock directed to pass through a properly configured contaminant separation reactor include exposing the fluid column to electromagnetic fields, ionization, electrolysis and the formation of free radicals.

As a fluid column passes through charged electrodes within a reactor housing, contaminants within a feedstock experience the neutralization of ionic and particulate charges. Electromagnetic forces act at the molecular level to shear the molecules by disrupting the outer orbits of molecules. In addition, electrolysis that tends to occur in aqueous based fluid columns provides hydrogen, oxygen, and hydroxyl liquids that attack contaminants within the feedstock. Cathodic reactions generate hydrogen gas and reduce the valence state of dissolved solids, causing some materials to become less soluble or achieve a neutral valence state. The anode generates oxygen gas, thereby allowing for the oxidation of many contaminants to occur. In instances where an electrode may be comprised of a sacrificial material, the anode also releases metallic ions into the feed stream that tend to bind with contaminants and form a flocculate.

The instant contaminant separation method also disrupts many of the forces that tend to keep suspended particles separated and dispersed throughout a fluid column. Following treatment, suspended particles typically attach to other particles and coalesce for effective separation. In addition, the flow of electrons through a contaminated fluid column eliminates many organisms and biological contaminants, such as bacteria, by altering the function of the cell membranes of the organisms. Surface membranes of many organisms are typically semi-permeable layers regulating water intake through osmotic forces with the electrical charge of fats and proteins in the surface membrane of the organism controlling this osmotic cellular water balance. The intense ion exchange and electromagnetic forces provided by the instant method of contaminant separation drive the surface membranes of biological contaminants to an imbalanced state by overwhelming the electrical field and charge of the organisms. Imbalanced surface membranes typically result in an organism excessively hydrating and then exploding or instigating the dehydration of the organism, causing it to implode. The increased flow of electrons frequently serves to end the cross-linking of proteins in membranes, terminating their cellular functions. Further, various electrode materials, such as copper, may donate ions to a feed stream to provide residual sanitizing properties to the fluid column. Thus, electromagnetic forces, and ions donated from sacrificial electrode plates, coupled with the oxidation of contaminants as they flow through charged electrodes cause the membranes and cell walls of many biological contaminants to collapse, thereby providing an effective means of biological contaminant destruction.

These combined treatment forces allow many contaminants within a fluid column to emerge from a contaminant separation reactor as newly formed compounds that tend to readily settle as a flocculate. The combined forces also aid in the degradation and extraction of biological contaminants and organic compounds and typically result in significant reductions of Total Petroleum Hydrocarbons, Total Suspended Solids, Total Dissolved Solids, Chemical Oxygen Demand, Biological Oxygen Demand, Fats/Oils and Greases, and Nitrogen Compounds when applied to suitable candidate feedstocks.

Additional benefits include destruction of many pathogens carried within the feedstock and significant reductions in the odor and turbidity of the effluent. A treated fluid column may be directed to separation or clarification apparatus to remove the flocculate, then to subsequent treatment phases, if necessary, to extract any remaining contaminants.

Conductivity of a fluid column is an important factor in contaminant separation and is primarily dependent upon the composition and quantity of contaminants carried within a fluid column. As used herein, conductivity may be described as the resistance to the flow of electrical charges through a fluid column. A feed stream comprised of a high percentage of suspended and dissolved elements may typically be more electrically conductive and therefore provide less resistance to the flow of electrical charges than a feedstock relatively free of suspended or dissolved matter. Seawater, for example, is typically more conductive than fresh water due to its high levels of dissolved minerals.

A constant flow rate of a fluid column through the electrodes and a constant flow of electrons between the electrodes are desired for effective treatment. In many instances, voltage supplied to the electrodes may be allowed to fluctuate with the instant conductivity of a fluid column to provide for a constant level of amperage being supplied to the electrodes. Therefore, the spacing of the electrodes, the conductivity of a feedstock and its influence upon the amperage driving the process along with the flow rate of a system are critical parameters in providing desired treatment.

While a specific electrode plate configuration of a prior art device may attain a desired level of contaminant separation for a specific fluid column, changes in composition of a feed stream often require modifying the spacing of the electrodes within the prior art device, or substituting another reactor having a different plate spacing configuration, in an attempt to reach desirable levels of fluid treatment as the makeup of the feedstock varies. Such modifications are time consuming and often result in suspension of fluid treatment while a suitable reactor configuration can be found. Therefore, use of many prior art contaminant separation reactors with feed streams of constantly varying composition is typically labor intensive and time consuming for effective treatment.

The reactor of the first embodiment of the instant invention is configured to provide treatment of a broad range of soluble and suspended contaminants from a variety of fluid columns. The reactor includes a housing defining an interior chamber established by a fluid impervious boundary wall with an inner surface and having inlet and outlet ports, and two opposing electrodes, each electrode comprising a plurality of parallel, spaced apart plates of an electrically conductive material coupled to a common buss bar wherein the spacing between the plates is non-uniform. Each electrode receives an opposite electrical charge, either positive or negative, from a power supply. A fluid column entering the inlet port of the reactor may be directed to follow a flow path formed by the opposing electrodes. The substantially parallel array of plates forming the flow path through the reactor are electrically charged with the first plate having an opposite charge from the second plate, the second plate having an opposite charge from the third plate, and so on. In this configuration, every plate forming the flow path through the reactor is connected to a common buss bar receiving an electrical charge opposite the charge provided to an adjacent plate.

The electrodes of the first embodiment of the instant invention may typically be arranged within the interior chamber of the housing as opposing electrodes with the plates of the electrodes being oriented orthogonal to the inlet and outlet ports. The plates of the opposing electrodes interleave in a parallel orientation to define a flow path from the inlet port to the outlet port and form a series of cavities of non-uniform volume. As such, the flow path of a fluid is substantially orthogonal to the direction of the electrical field established between opposing electrode plates.

By arranging the electrode plates within a housing in such an orientation, a fluid flowing through the interleaved array of oppositely charged electrode plates is exposed to a variety of electron flux between the surfaces of the opposing electrode plates and along the edges of the plates. Once a fluid column enters the reactor and begins flowing between the electrodes, the spacing between the parallel plates is graduated so that the volume of the cavities between the opposing electrodes progressively increases. Thus, as a fluid column flows along a flow path extending substantially parallel to the surface of each electrode plate and approaches the outlet port of the reactor, the volume of each cavity along the fluid flow path through the housing progressively increases from the inlet port to the outlet port. Graduated spacing between the electrode plates allows for treatment of a broad range of contaminants from a variety of fluid columns due to the varying levels of electromagnetic fields, ionization, electrolysis and free radical formation provided within the fluid flow cavities. The fixed array of electrons having a graduated spacing configuration overcomes the deficiency of prior art devices that require replacing one reactor with another having different electrode configurations or opening a reactor to rearrange movable electrode plates to provide an electrode configuration to effectively treat a feedstock that constantly varies in composition.

A feedstock may be directed to flow through the variably spaced electrodes of the instant invention so as the feed stream passes through each fluid flow cavity of a reactor, the volume of each cavity along the fluid flow path through the housing progressively increases from the inlet port to the outlet port. Further, in contrast to the laminar flow provided by the reactors of many prior art devices, the flow path through the graduated spacing of parallel plates and buss bars forming the electrodes of the instant invention provides for increased turbulence within the fluid column as it passes through the reactor. Turbulence within the reactor significantly increases the incidence of surface contact of the fluid column with the charged electrodes and provides the feed stream with exposure to the varying levels of electrical charges between the electrode plates.

The second embodiment of the contaminant separation reactor of the instant invention includes a plurality of contaminant separation sectors disposed in a substantially coplanar array within a single housing. Individual contaminant separation sectors are configured to replicate the surface area and quality of treatment typically attained by small laboratory reactor cells. As used herein, a contaminant separation sector shall mean a distinct fluid treatment unit comprising a pair of electrodes, each electrode comprising a plurality of parallel, spaced-apart plates of an electrically conductive material coupled to a common buss bar wherein the spacing between the plates of each contaminant separation sector is uniform. A contaminant separation sector may be connected to a supply of electrical power or other contaminant separation sectors. Each electrode of a sector may receives an opposite electrical charge, either positive or negative, from a contaminant separation power supply or an electrode of an adjacent sector so that in each sector, the substantially parallel, spaced-apart array of plates are electrically charged with the first plate having an opposite charge from the second plate, the second plate having an opposite charge from the third plate, and so on.

A plurality of contaminant separation sector may be disposed within a reactor housing defining an interior chamber established by a fluid impervious boundary wall with an inner surface and having inlet and outlet ports, so that a fluid flowing through the housing may move substantially parallel to the facing surfaces of the opposing electrodes. As such, the fluid flow path extends substantially orthogonal to the direction of the electrical field established between opposing electrode plates. Further, arranging the electrode plates of the contaminant separation sectors in such an orientation to the fluid flow path allows the substantial amount of electron flux concentrated along the edges of the electrode plates to provide for increased intensity of electron flow through a fluid column.

Connections between contaminant separation sectors disposed within the housing and the power supply form an electrical circuit. A fluid column entering the inlet port of the reactor may be directed to flow through the evenly spaced parallel array of plates of the initial contaminant separation sector within the housing and then be directed to flow through subsequent contaminant separation sectors disposed within the housing.

In many instances it may be desirable to place static mixing apparatus within the reactor housing to disrupt any laminar flow that may result from a fluid column passing between parallel arrays of plates. Static mixing apparatus may be also be utilized to redirect a feedstock flowing near the internal wall of a housing to the charged electrodes for treatment. Further, a parallel array of plates comprising the electrodes of a contaminant separation sector may be arranged within a reactor housing at an angle to the direction of flow of a feed stream through the reactor to disrupt laminar flow and increase turbulence within a reactor.

The plurality of contaminant separation sectors may be connected in series or parallel to a power supply to attain the desired fluid treatment. The preferred method of arranging the contaminant separation sectors of the second embodiment of the instant invention includes connecting the first electrode of a first contaminant separation sector to a first terminal of a power supply. The second electrode of the first sector is connected to a first electrode of a second contaminant separation sector then the second electrode of the second sector is connected to a second terminal of the power supply to form an electrical circuit in series. When more than two contaminant separation sectors are utilized within a housing, the electrodes of an intermediate sector may be connected to electrodes of the contaminant separation sector immediately preceding or succeeding it to complete the electrical circuit.

The spacing between the array of plates of one contaminant separation sector may differ from the spacing between the array of plates of other contaminant separation sectors within a single housing. By arranging a plurality of sectors having different and distinct electrode spacing configurations within a single housing, a broad range of treatment is provided. Varied arrays of electrodes within a single housing overcome the deficiency of prior art devices that require one reactor to be replaced with a reactor having a different electrode configuration, or opening a reactor and rearranging movable electrode plates, to find a configuration of electrodes that will effectively treat feedstocks of constantly varying composition.

Utilization of a plurality of contaminant separation sectors disposed within a single housing allows sectors comprised of dissimilar metals to be arranged within the housing and powered by a single power supply. For example, a feed stream may require treatment with carbon steel plates to break oil and water emulsions and donate iron ions to a feedstock that combine with suspended and dissolved metals, followed by treatment with aluminum plates to form a stable flocculate that may be readily extracted from the feedstock. Contaminant separation sectors comprised of carbon steel plates and contaminant separation sectors comprised of aluminum plates may be arranged within a single reactor housing and utilize a single power supply to achieve the desired carbon steel to aluminum treatment ratio required for treatment of the fluid column. Various combinations of sectors comprised of a variety of materials may be utilized to achieve the desired treatment of feedstocks.

Connecting sectors in series results in each contaminant separation sector receiving an identical amount of electrical current to drive the treatment. By connecting contaminant separation sectors in series, a relatively low amount of constant current may be applied to the electrodes in each sector to achieve the desired levels metal ions and electrons that may be dispersed into a fluid column at a given flow rate to achieve the effective treatment of a feed stream. Lower amperage levels typically result in less heat generation, reduced arching between electrodes and prolonged treatment life of contaminant separation sectors due to the reduced degradation of sacrificial electrode materials. In a series arrangement of sectors within a housing, the voltage required to maintain the constant current level supplied to the sectors is typically the sum of the voltage levels required to maintain the current level of each sector.

The voltage supplied to each sector may vary based on parameters such as the composition of the materials forming each sector and the total surface area of a sector as determined by the size of the plates comprising the electrodes and the spacing between the electrode plates. These parameters have a direct effect on the strength of the magnetic field and the treatment provided by each sector. For example, sectors comprised of sacrificial metal materials tend to disperse more metal ions into a fluid column for electrochemical treatment of the feedstock while non-sacrificial electrodes tend to provide for a more substantial generation of hydrogen and oxygen as a result of increased electrolysis activity.

Utilization of contaminant separation sectors electrically connected in series and comprised of dissimilar metals wherein the spacing and composition of the electrodes of one sector may differ from the spacing and composition of plates of other sectors within a single housing allows for a broader range of fluid treatment. Effective treatment of feed streams at higher flow rates may be attained while typically maintaining a low current level. The instant invention therefore provides an effective means of contaminant separation that may be attained by a device having a much smaller footprint and requiring less power to operate than prior art devices.

The power supply for the contaminant separation reactor of the instant invention may be configured to enhance the efficiency of the treatment process by providing for the regulation and modification of the electrical voltage and current applied to the electrodes. The electrical charges applied to the electrodes within a reactor may be adjusted based on parameters such as the composition and conductivity of a feedstock, the desired level of treatment, the materials comprising the electrodes and their arrangement within a reactor housing and system flow rates.

For example, the power supply may be designed and configured to utilize the conductivity of a fluid column to automatically regulate the voltage applied to the electrodes within a reactor to maintain the desired current levels for effective treatment of the fluid column. The electrical current supplied to the electrodes may be adjusted and fluid samples may be analyzed during the initial start up of a system to ascertain the most favorable current level required to provide the desired treatment of a feedstock. Upon determining the desired current level, the power supply may then utilize the conductivity of the feed stream to automatically regulate the voltage required to maintain the desired current level.

Feed streams having a high level of conductivity typically provide lower levels of resistance within the fluid column than feedstocks with lower levels of conductivity. Thus, the greater the conductivity of a feed stream, and therefore the lower the level of resistance, the less voltage required to maintain the desired electrical current level supplied to the electrodes to achieve the preferred level of fluid treatment.

The simple equation $I=V/R$ may be utilized to demonstrate fluid columns having high levels of conductivity typically provide lower levels of resistance to the flow of electrical current and require less voltage to maintain the desired electrical current supplied to the electrodes. In the equation, I represents the desired electrical current, V represents the voltage and R represents the resistance within the fluid column to the flow of electrical current. In any fractional equation, in order for the quotient to remain constant when the denominator decreases, the numerator must also decrease. Therefore, in order for current I to remain constant while resistance R decreases due to the increased conductivity of the feedstock, voltage V must also decrease.

The power supply may have the capability of automatically adjusting its output of voltage to the electrodes within a reactor to maintain the desired current level required to effectively treat a feedstock as the conductivity of a feed stream fluctuates. Thus, changes in the make up of the feed stream, and therefore its conductivity, are typically of little consequence in the ability of the instant invention to effectively treat feedstocks of varying composition.

A power supply may also be configured to automatically alternate the positive and negative charges applied to the opposing electrodes to impede the formation of deposits on the electrodes. To achieve the desired level of treatment for certain feed steams, a reactor may employ the sacrificial degradation of certain electrode plates. For example, sacrificial aluminum plates may be utilized to clarify aqueous feed streams and enhance contaminant separation. The periodic reversing of the polarity supplied to the opposing electrodes plates tends to provide for a more uniform degradation of such sacrificial electrodes over time. However, when automatically alternating the polarity of the charges supplied to the electrodes, a brief period of time is required where no power is supplied to the electrodes prior to reversing the polarity to allow the previous electrical charge to dissipate from an electrode.

Utilizing a magnetic field generator to pretreat a fluid column and place elements within a feed stream in suspension typically increases the effectiveness of the contaminant separation electrodes of the instant invention. Magnetic fluid treatment typically retards the accumulation of contaminants as deposits on electrode plates by inducing similar charges to the elements carried within a feedstock. By subjecting a feed stream to an intense magnetic field, dissolved substances within the fluid column tend to remain in suspension due to their decreased incidence of surface contact and bonding as a result of similarly charged ions repelling each other as they pass through the reactor instead of forming adhesive deposits that could otherwise coat electrodes and impede their efficiency. Thus, magnetic treatment of a feedstock typically prevents clogging and restricted flow within a contaminant separation reactor by placing elements within a feed stream in suspension and impeding the formation of deposits on electrodes that could diminish the effective generation of electrical charges between the electrically charged plates.

Pretreating the fluid column facilitates the removal of contaminants, and may include pH adjustment of the feed stock or extraction of readily recoverable contaminants via gravity, skimming, centrifugal, coalescing or other separation methods.

Increase treatment flow rates may be attained by placing a plurality of contaminant separation sectors within the interior chamber of the housing such that the electrodes of the contaminant separation sectors are disposed in a substantially coplanar array in a distinct layer. Such an arrangement of the contaminant separation sectors provides a substantially greater fluid treatment surface area to a fluid column passing through the housing than placing a plurality of contaminant separation sectors within the interior chamber of the housing such that the electrodes of the contaminant separation sectors are arranged in substantially parallel planes and in distinct layers.

Enhanced fluid treatment may be attained by flowing a magnetically treated feed stream through a plurality of contaminant separation sectors disposed within the interior chamber of the housing in a plurality of distinct layers, each layer comprising a plurality of contaminant separation sectors within the interior chamber of the housing such that the electrodes of the contaminant separation sectors are disposed in a substantially coplanar array in a distinct layer.

At least one electric power supply may be coupled to the electrodes to produce an electric field acting within the series of cavities to separate contaminants carried within the fluid column. The buss bar of an electrode may be connected directly to an electrical power supply, or connected in series or parallel to the buss bar of an adjacent sector within a single reactor housing to form an electrical circuit. Further, multiple power supplies may be utilized to apply electrical energy to the electrodes of the contaminant separation sectors within a single reactor housing to produce an electric field that causes contaminants carried within the magnetically treated feed stream to separate from the fluid column, and it may be desirable to energize a first contaminant separation sector with a first power supply and energize a second contaminant separation sector with a second power supply.

The benefits of utilizing ozone and other forms of oxidation to eliminate biological contaminants have long been practiced, but the effects of magnetic treatment in treating feed streams to eradicate such contaminants is relatively new. Exposing feedstocks containing biological contaminants to concentrated magnetic fields has been shown to collapse the cell walls and destroy the membranes of such contaminants. Thus, electrolysis and magnetic field generation provided by the instant invention may be of particular utility in the destruction and elimination of a great many microorganisms because unlike antibiotics or chemical treatment, bacteria and other biological contaminants cannot develop immunity to such treatments.

The instant invention may be configured to operate at low pressures and high flow rates. Ongoing maintenance consists of regularly scheduled inspections and cleaning. Periodic adjustment of the power supply may be required to compensate for the degradation of electrodes comprised of sacrificial materials.

BRIEF DESCRIPTION OF THE DRAWINGS

The accompanying drawings illustrate the preferred embodiments of the invention in which.

DESCRIPTION OF THE PREFERRED EMBODIMENT

Figure 1:
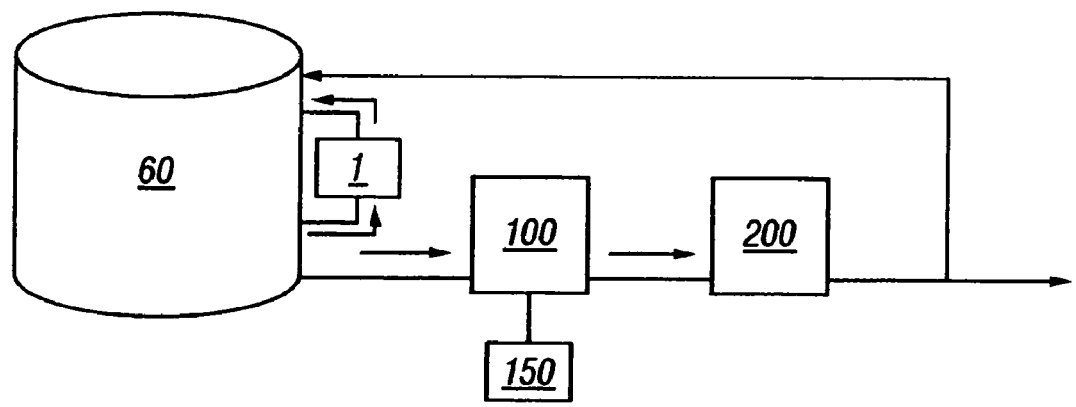
FIG. 1 is a block diagram of combined magnetic and contaminant separation methods for treatment of fluid columns.

The instant invention utilizes revised principles of magnetic treatment with electrochemistry and physics to result in a synergy of technologies and principles integrated into a method and apparatus capable of treating a wide variety of contaminated feedstocks to produce an effluent that may typically be reused or discharged into the environment. As a contaminated feed stream moves through the system, treatment of the feedstock may be accomplished by utilizing magnetic fields, ionization, electrolysis and free radical formation.

The basic system may consist of a magnetic field generator and a reactor containing electrically conductive electrodes. After magnetic treatment has been used to loosen and eliminate scale and other deposits from a piping system or other source, a feedstock may be directed to flow through charged electrodes where a number of treatment processes occur. The instant invention typically utilizes electrical forces to neutralize ionic and particulate charges and remove contaminants such as colloidal particulates, oils and dissolved metals from previously stable suspensions and emulsions.

For example, electromagnetic forces are utilized to overcome the forces creating an emulsion and allow oil droplets to separate from a fluid column. A principal cathodic reaction of an electrode reduces hydrogen ions to hydrogen gas and reduces the valence states of dissolved metals. An electrode functioning as an anode may release metallic ions into a feed stream and liberate oxygen gas from the aqueous portion of a feedstock. As a result, newly formed compounds precipitate into a readily settable and easily dewatered sludge. The resulting flocculate is similar to a chemically formed flocculate, however, the instant flocculate tends to be larger and provide for faster separation than chemically formed flocculates. Subsequent treatment may be used to facilitate the removal of the flocculate and other dissolved and suspended contaminants to provide an effluent typically suitable for reuse or discharge.

Magnetic treatment provides for a significant reduction in the surface tension of water and aids in the maintenance and operation of heat exchange equipment. Scale deposits within the walls of piping systems and on components of heat transfer equipment restrict flow and increase energy consumption in heat exchange systems. In cooling towers, boilers and other heat exchange equipment, magnetic treatment may be utilized to remove scale that tends to inhibit the transfer of heat carried by water flowing through such systems.

In applications that require a water column to constantly circulate through a piping system, magnetic water treatment may be used to prevent the formation of scale deposits within the system. Residual effects of magnetic treatment typically result in the softening of existing scale and other deposits within a piping system and allow the scale to disperse into the water column. Magnet treatment may further be utilized to effectively destroy bacteria and other biological contaminants in fluid columns by causing the cell walls and membranes of such organisms to collapse when a feedstock is exposed to concentrated magnetic charges.

While a fundamental use of magnetic treatment may be to loosen and eliminate scale and deposits from piping systems, magnetic forces also overcome forces that cause emulsions and can be utilized to accelerate the separation of oil and water. Oil has a lower specific gravity than water and will typically float on a volume of water. However, mechanical agitation can shear the interface of distinct layers of oil and water so that small oil droplets may become dispersed in the water. In a static state, these small oil droplets tend to coalesce, form larger droplets and will eventually float out of suspension.

The addition of surfactants will allow a thin molecular coat of the surfactant to be adsorbed onto the surfaces of the oil droplets, thereby polarizing the oil droplets, causing them to repel each other and remain in a dispersed state. These small oil droplets result in a substantial increase in the surface area of the oil suspended within a water column and the tendency of the oil to form a stable dispersion or emulsion. Under the influence of a magnetic field, adsorbed ions supplied by a surfactant that give an oil droplet its surface charge begin to move across the surface of the droplet and result in the formation of a dipolar charge of the oil droplets. The dipolar droplets then begin to agglomerate under the force of mutual electrostatic attraction as they collide and coalesce until their buoyancy overcomes their repulsive forces. The magnetically treated feedstock may then be processed by conventional oil-water separation to remove the oil.

While magnet treatment serves to reduce and eliminate scale and other deposits as well as accelerate the separation of oil and water, contaminants such as bacteria, algae, oils, clays, silica, and heavy metals may be held in suspension within a water column following magnetic treatment. The instant method of contaminant separation may be used to neutralize the charges suspending the contaminants within a fluid column and allow them to precipitate and separate from a feedstock.

Contaminant separation has been employed for years in water treatment where electric voltage is used to produce a strong electromagnetic field to disrupt the attraction of suspended particles and allow contaminants to precipitate. Early contaminant separation methods provided excellent contaminant removal compared to chemical precipitation, but high capital and operating costs and low flow rates tended to restrict the use of these prior art devices. Today, chemical treatment is less acceptable due to more stringent discharge regulations. Further, the resulting solid residues are typically classified as hazardous materials that require additional treatment. The development of a magnetic field generator and a contaminant separation reactor have resulted in the invention advanced hereto for a method and apparatus capable of providing effective treatment of fluid columns.

Fluid columns that have previously been exposed to magnetic treatment tend to be more readily treated by the instant method of contaminant separation. The residual effect of inducing similar charges to dissolved and suspended substances within a fluid column allows contaminants within a feed stream to remain in suspension rather than form adhesive deposits. By causing contaminants within a fluid column to become non-adhesive, feed streams typically flow more freely and are less likely to clog the flow path of a contaminant separation reactor or coat the electrodes of a reactor with accumulated contaminant deposits. The reactor of the instant invention utilizes a single power supply and has a smaller footprint, lower operating costs and a capacity for greater flow rates than prior art devices.

FIG. 1 is a block diagram of the fluid treatment method disclosed herein where a magnetic field generator 1 is shown as part of a closed-loop treatment system to reduce and prevent the formation of scale and other deposits within the interior walls of the piping system and other components of heat transfer device 60.

Magnetic field generator 1 may be comprised of a length of conduit having a fluid impervious boundary wall with an inner surface and an outer surface and having a fluid entry port and a fluid discharge port. A segment of said conduit may be encircled by an electrical conductor, said electrical conductor being coiled around a segment of the conduit to form a first layer of coiled electrical conducting material and a second layer of coiled electrical conducting material coaxially disposed and spaced apart from one another by a pattern of spacers.

The pattern of spacers forms a plurality of open-air cooling ducts between the coaxially disposed and spaced apart layers of electrical conductor and promotes the cooling of the coiled electrical conductor by allowing air to flow between the layers of coiled electrical conductor. A fluid column circulated through device 60 may be directed to electromagnetic field generator 1 to receive magnetic treatment and place scale and other contaminants within a feed stream in suspension. The fluid column may then be returned to device 60 for further utilization in the transfer of heat.

As the amount of contaminants within the fluid column reaches a level that affects the heat transfer ability of the fluid column, the fluid column may then be directed to flow through contaminant separation reactor 100 where contaminants in the feedstock may bond into a stable flocculate to facilitate their separation from the fluid column. A fluid column treated within reactor unit 100 may then be discharged for separation of the resulting flocculate by means of filtration, settling within a static tank or other suitable separation techniques provided by apparatus 200. A treated fluid column may then be directed to subsequent treatment devices, if necessary, to extract any remaining contaminants and then returned to device 60 for additional service or discharged into the environment.

Power supply 150 may be utilized to energize the electrodes within reactor 100 of the contaminant separation unit. The power supply may be configured to allow the level of electrical current supplied to the electrodes to be adjusted and set to achieve the desired treatment of a feed stream. The power supply may further have the capability of utilizing the conductivity of a feed stream to regulate the supply of voltage required to maintain the desired current level to the electrodes. Providing an automatically variable, or floating, supply of voltage to the electrodes within the reactor allows the desired treatment of a feed stream to consistently be achieved, even as the conductivity of the feedstock passing through the reactor may change from time to time. Utilizing the conductivity of a feed stream to regulate a floating voltage supply and maintain the desired level of electrical current supplied to electrodes is typically referred to as a current driven application of contaminant separation. In some instances it may be desirable to set the voltage level and allow for a variable supply of electrical current in a voltage driven application.

Contaminant separation power supply 150 typically converts alternating current from an appropriate power source, rectifies it, and provides direct current and voltage to the power supply terminals of the opposing electrodes of reactor 100 via first and second electrical terminal connections. The electrical charges applied to the electrodes within a reactor may be adjusted based on parameters such as the composition and conductivity of a feedstock, the desired level of treatment, the materials comprising the electrodes and their arrangement within a reactor housing and system flow rates. The polarity of the voltage and current may automatically reverse from time to time to remove scale and other deposits and provide for a relatively uniform rate of degradation of electrodes comprised of sacrificial materials.

Figure 2:
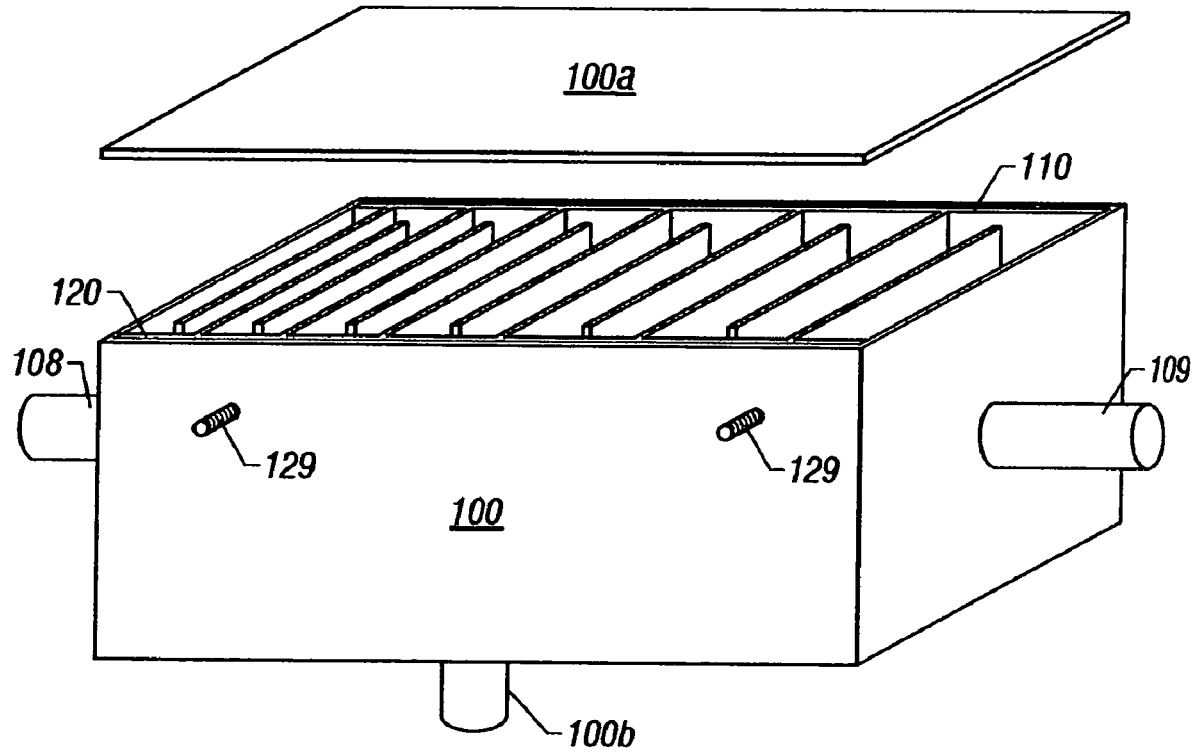
FIG. 2 illustrates an open top view of opposing electrodes within the housing of the first embodiment of the contaminant separation reactor of the instant invention.

FIG. 2 depicts an open top view of the contaminant separation reactor of the first embodiment of the instant invention. Opposing electrodes 110 and 120 are shown within reactor housing 100 defining an interior chamber established by a fluid impervious boundary wall with an inner surface and having inlet and outlet ports. Each electrode is comprised of a plurality of parallel, spaced apart plates of an electrically conductive material coupled to a common buss bar wherein the cavities between the plates are non-uniform and the plates are fixed in a perpendicular orientation to the buss bar. The electrode plates are arranged in a parallel pattern that provides for progressively greater distances between the facing surfaces of each adjacent plate. The plates of the opposing electrodes interleave in a parallel orientation to define a flow path from the inlet port to the outlet port and form a series of cavities of non-uniform volume. As such, the flow path of a fluid is substantially orthogonal to the direction of the electrical field established between opposing electrode plates.

Power supply terminals 129 are fixed to the buss bar of electrode 120 and are shown extending through the side of reactor housing 100. In addition to providing a means of connecting electrode 120 to the contaminant separation power supply, terminals 129 may also be used to secure electrode 120 within reactor housing 100.

Within reactor 100, positive voltage and current from the power supply may be applied directly to power supply terminal 129 and flow through the buss bar to the parallel array of plates forming electrode 120. Negative voltage and current from the power supply may be connected directly to the power supply terminal of electrode 110 and flow through its buss bar to its parallel array of plates. Each plate is energized with an electrical charge opposite from its adjacent plate, creating a differential voltage between adjacent plates. As a fluid column follows the flow path created by the cavities between the electrode plates, the conductivity of a feedstock facilitates the influence of the voltage and current on the feed stream. Within reactor 100, each electrode plate maintains a relatively equal, but opposite, electrical charge to that of an adjacent plate of the opposing electrode.

Electrodes 110 and 120 are arranged within reactor 100 so the bottom edge of the buss bars and the parallel, plates fixed to the buss bar in a graduated spacing configuration to form each electrode are in fluid communication with the inside bottom surface of reactor housing 100. The buss bars of electrodes 110 and 120 are positioned to be in fluid communication with the inner side walls of reactor housing 100 and held in place and secured within the reactor by the power supply terminals that extend through the side walls of the reactor housing. Electrodes 110 and 120 may be sized so that the top edges of their buss bars and their parallel plates in a graduated spacing configuration are in fluid communication with the inside of removable reactor top 100*a* when it is fastened to reactor housing 100.

Regular maintenance and cleaning of reactor unit 100 is greatly simplified by the above-mentioned construction. The operator need only unfasten reactor top 100*a* from reactor housing 100 to access electrodes 110 and 120 for cleaning. Debris rinsed from the electrodes and flow path of the reactor may be directed to clean out drain 110*b* for discharge from the apparatus.

Figure 3:
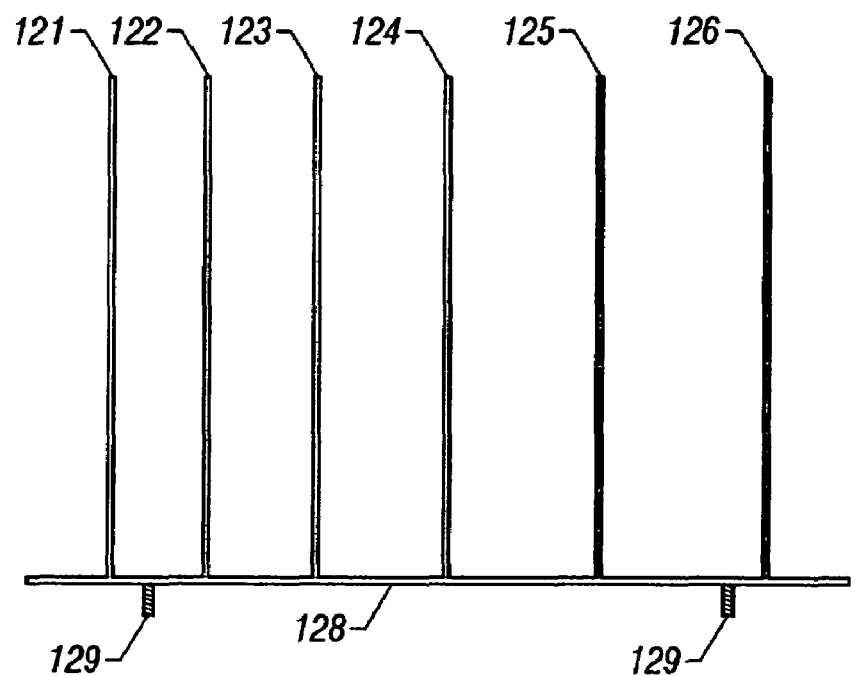
FIG. 3 is a detailed view of an electrode utilized in the first embodiment of the contaminant separation reactor of the instant invention.

FIG. 3 is a top view of an electrode utilized in the contaminant separation reactor of the instant invention. Plates 121, 122, 123, 124, 125 and 126 typically are of a uniform thickness, length and height and are connected as a fixed parallel array to buss bar 128. Power supply terminal 129 is fixed to buss bar 128 and facilitates the flow of electricity from the power supply to the parallel array of plates 121, 122, 123, 124, 125 and 126. Metal plates are typically used to form the electrodes with the most commonly used materials being carbon steel, aluminum, copper, titanium and stainless steel. The composition of a feedstock and the desired quality of treatment typically determine the type of material utilized to form the electrode plates. For example, fluid columns may be treated with electrodes formed of relatively non-sacrificial materials, such as stainless steel or titanium, that typically do not donate ions to the feedstock under the influence of electrolysis. Electron flow between the charged plates, coupled with electromagnetic field generation and the creation of oxygen, hydrogen and OH radicals, provide an effective means of destroying microorganisms and biological contaminants while also breaking the bonds creating emulsions.

In other applications, sacrificial plates may be used to disperse ions into a fluid column to facilitate the precipitation of suspended and dissolved contaminants. When voltage is applied across plates used to form sacrificial electrodes, the electrode functioning as the anode may donate metal ions to the feed stream as part of the contaminant separation process.

Figure 4:
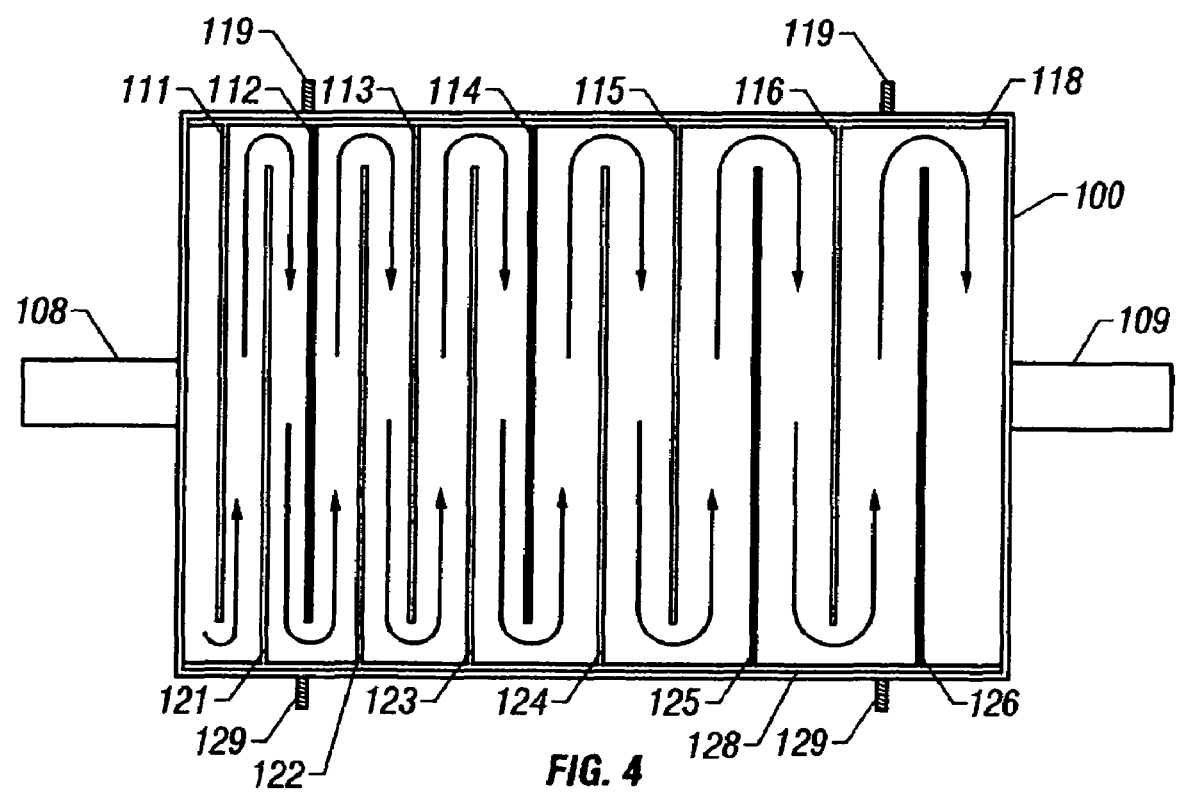
FIG. 4 shows the fluid flow path through the plates forming the electrodes of the first embodiment of the contaminant separation reactor of the instant invention.

As shown in FIG. 4, the electrode plates within reactor unit 100 are arranged in a parallel orientation. However, the spacing between the parallel plates of the two electrodes is non-uniform and graduated so that the volume of the cavities between the opposing electrodes progressively increases as a fluid column flows through the reactor. Graduated spacing allows for treatment of a broad range of contaminants from a variety of fluid columns and eliminates the need of prior art devices to try reactors having different plate configurations or opening a reactor and rearranging movable plates in an effort to find an electrode configuration that will provide effective treatment for feedstocks that vary in composition from time to time.

The space between the buss bar of one electrode and the end of an opposing electrode plate may typically be greater than the space between the adjacent plates of the opposing electrodes. Such spacing allows a fluid to flow around the end of one plate, into the adjoining fluid flow chamber and around the end of the adjacent plate of the opposing electrode, thus defining the flow path. The plates of the opposing electrodes interleave in a parallel orientation to define a flow path from the inlet port to the outlet port and form a series of cavities of non-uniform volume. As such, the flow path of a fluid is substantially orthogonal to the direction of the electrical field established between opposing electrode plates.

A feedstock entering reactor housing 100 through inlet 108 may flow into the cavity between the inside wall of the reactor housing 100 and electrode plate 111. The feed stream may then pass through the open area between the end of plate 111 and buss bar 128 of the opposing electrode and into the cavity between plate 111 of the first electrode and plate 121 of the opposing electrode. The fluid column may then flow through the gap between the end of plate 121 and buss bar 118 and into the cavity between oppositely charged electrodes plates 121 and 112, and so on.

The feedstock may continue to flow through successive adjacent cavities of non-uniform volume by following a flow path around the end of a parallel plate of one electrode and then around the end of a parallel plate of the other electrode in a back-and-forth direction across the interior of the housing to outlet 109 for discharge from reactor housing 100.

Figure 5:
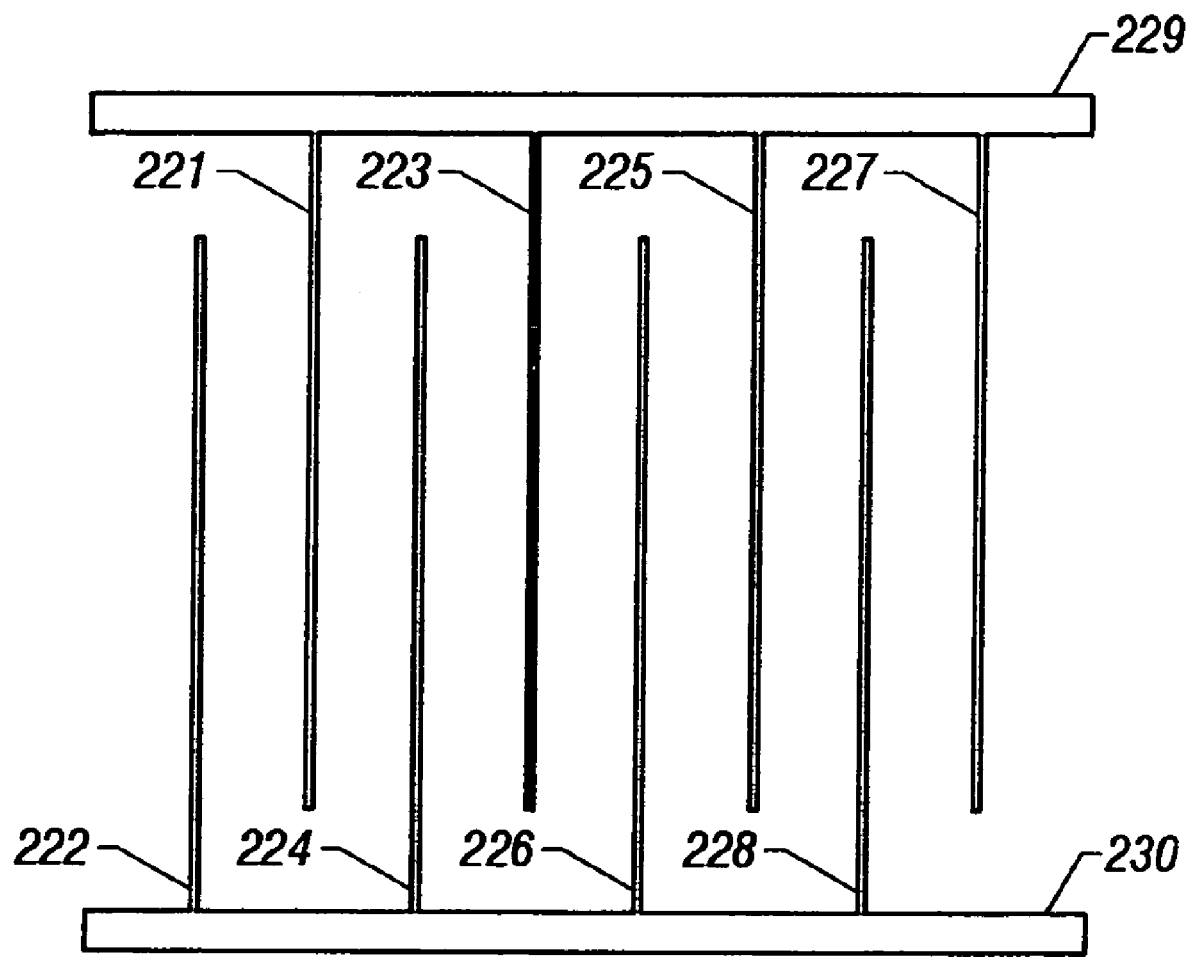
FIG. 5 is a detailed view of a contaminant separation sector utilized in the second embodiment of the contaminant separation reactor of the instant invention.

FIG. 5 is a top view of a contaminant separation sector utilized in the second embodiment of the contaminant separation reactor of the instant invention. As used herein, a contaminant separation sector shall mean a distinct fluid treatment unit comprising a pair of electrodes, each electrode comprising a plurality of parallel, spaced-apart plates of an electrically conductive material coupled to a common buss bar wherein the spacing between the plates of each contaminant separation sector is uniform. Plates 221, 223, 225 and 227 are typically comprised of an electrically conductive material having a uniform thickness, length and height and fixed as a parallel array to buss bar 229. Plates 222, 224, 226 and 228 are typically comprised of an identical electrically conductive material having a uniform thickness, length and height and fixed as a parallel array to buss bar 230.

Buss bar 229 facilitates the flow of electricity to the parallel array of plates 221, 223, 225 and 227 while buss bar 230 facilitates the flow of electricity to the parallel array of plates 222, 224, 226 and 228. A buss bar may be connected directly to an electrical power supply, or connected in series or parallel to the buss bar of an adjacent sector within a single reactor housing to form an electrical circuit. Further, multiple reactor housings may be connected in series or parallel and driven by a single power supply to provide for increased system flow rates.

Metal plates are typically used to form the electrode plates and buss bars of the contaminant separation sector with the most commonly used materials being carbon steel, copper, stainless steel, titanium and aluminum. Electrodes formed from metals having a characteristic of acting as sacrificial plates may be used to disperse ions into the fluid column to facilitate the precipitation of the suspended and dissolved contaminants. It is desirable to periodically reverse the polarity of the electrical energy applied to sacrificial electrodes to allow them to degrade relatively equally and to reduce scaling and plating by contaminants in the feedstock.

Electrodes comprised of different metals, varied spacing configurations or having varied surface areas may be arranged within a reactor housing and driven by a single power supply. For example, a feedstock may initially be exposed to a sector comprised of sacrificial carbon steel electrodes that donate iron ions to the feed stream that may combine with suspended and dissolved metals, and other contaminants, in the fluid column. A sector comprised of sacrificial aluminum electrodes may then be utilized to clarify the fluid column by distributing aluminum ions into the feedstock previously exposed to the carbon steel sector to coalesce with the carbon steel ions that have combined with metals and other contaminants suspended within the feed stream to form a stable flocculate that is easily separated from the fluid column.

Figure 6:
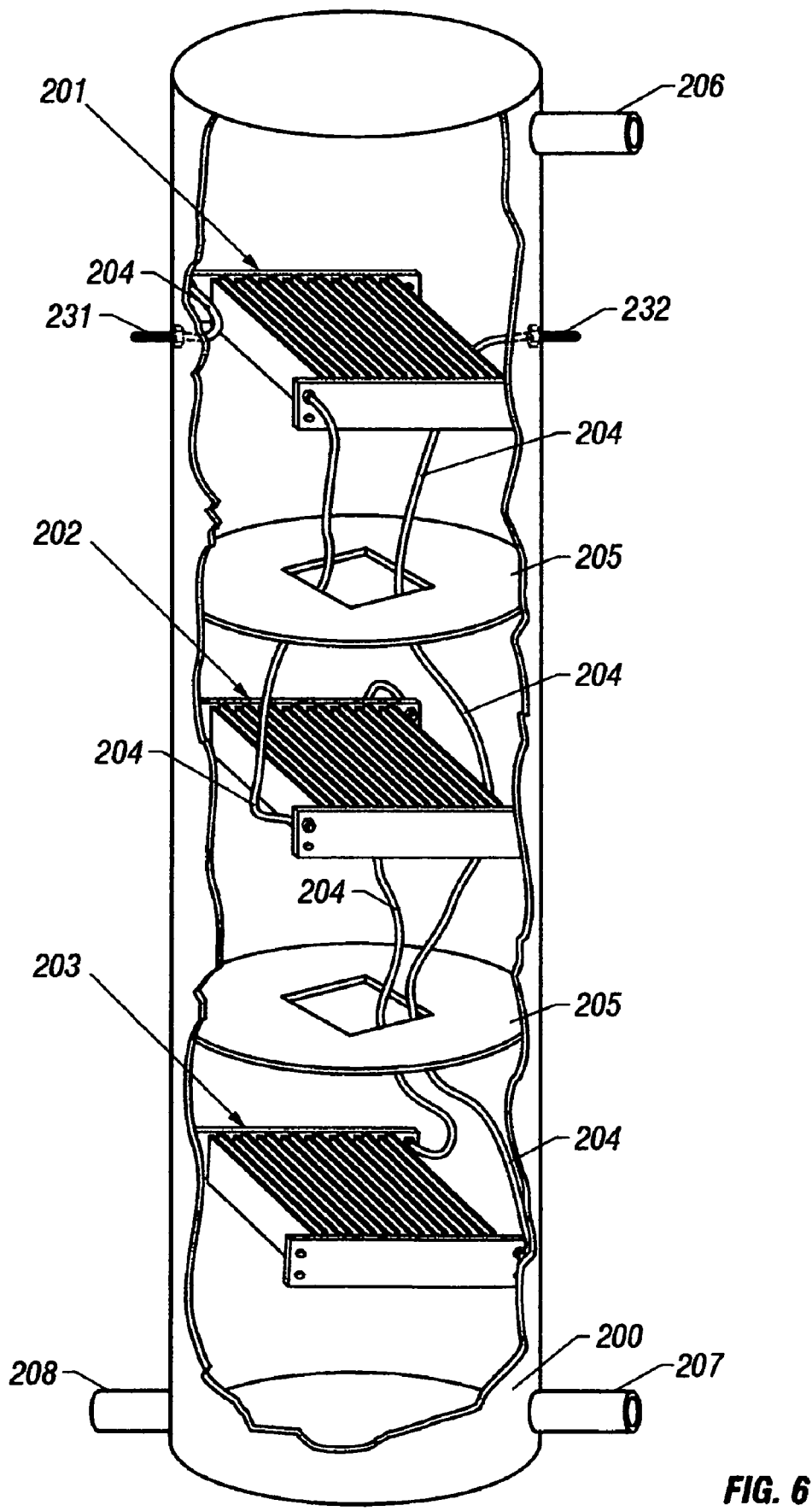
FIG. 6 is a cut-away view of a reactor housing showing an arrangement of the contaminant separation sectors of the second embodiment of the instant invention.

FIG. 6 depicts a cut-away view of the second embodiment of the instant invention and shows a plurality of contaminant separation sectors 201, 202 and 203 layered in a substantially coplanar array. As used herein, a contaminant separation sector shall mean a distinct fluid treatment unit comprising a pair of electrodes, each electrode comprising a plurality of parallel, spaced-apart plates of an electrically conductive material coupled to a common buss bar wherein the spacing between the plates of each contaminant separation sector is uniform. Each electrode of a contaminant separation sector is comprised of a plurality of parallel, spaced apart plates coupled to a common buss bar wherein the spacing between the plates is uniform. The individual contaminant separation sectors are configured to replicate the surface area and quality of treatment attained by small laboratory reactor cells and are connected in series by electrical jumpers 204 within reactor housing 200, said housing defining an interior chamber established by a fluid impervious boundary wall with an inner surface and having inlet and outlet ports.

Each sector of the second embodiment of the instant invention is typically arranged within the interior chamber of a housing as opposing electrodes with the plates of the electrodes being oriented substantially parallel to the fluid flow path through the housing. The plates of the opposing electrodes of each sector interleave in a parallel orientation to define a flow path from the inlet port to the outlet port and form a series of cavities of uniform volume provided by the even spacing between the facing surfaces of adjacent plates. However, the volume of the cavities between the facing surfaces of the electrode plates of one sector may differ from the volume of the cavities between the facing surfaces of the electrode plates of other sectors in the layered and substantially coplanar array of a plurality of contaminant separation sectors disposed within a housing. Each plate in a sector is energized with an electrical charge opposite from its adjacent plate, resulting in a differential voltage being created between adjacent plates. Arranging the electrode plates of the contaminant separation sectors in such an orientation to the fluid flow path allows the substantial amount of electron flux concentrated along the edges of the electrode plates to provide for an increased intensity of electron flow through a fluid column. As such, a fluid entering reactor housing 200 through inlet port 207 and discharged through outlet port 206 flows through the housing substantially parallel to the facing surfaces of the opposing electrodes so that the fluid flow path extends substantially orthogonal to the direction of the electrical field established between opposing electrode plates.

A contaminant separation power supply typically converts alternating current from an appropriate power source, rectifies it, and provides direct current and voltage via first and second electrical terminal connections to the power supply terminals 231 and 232 of the opposing electrodes of reactor 200. The voltage and current supplied to the reactor by the power supply may be automatically reversed at predetermined intervals to clear the plates of scale and other deposits and provide for a relatively uniform rate of degradation of sacrificial electrodes.

Power supply terminal 231 extending through the side of reactor housing 200 is connected to the first electrode of contaminant separation sector 201 via jumper 204. The second electrode of contaminant separation sector 201 is connected to the first electrode of contaminant separation sector 202 via jumper 204. The second electrode of contaminant separation sector 202 is connected to a first electrode of contaminant separation sector 203 via jumper 204. The second electrode of contaminant separation sector 203 is connected to power supply terminal 232 extending through the side of reactor housing 200 via jumper 204.

Power supply terminal 231 may be connected to the positive terminal of a power supply and power supply terminal 232 may be connected to the negative terminal of a power supply to allow electrical energy to flow through contaminant separation sectors 201, 202 and 203 connected in series. The conductivity of a feedstock influences the voltage required to maintain the desired level of current for effective treatment as a feed stream passes between adjacent plates having opposite electrical charges in the substantially coplanar array of contaminant separation sectors. Within reactor housing 200, each array of plates forming one electrode of a contaminant separation sector maintains the same levels of current and voltage relative to the array of plates forming the opposite electrode of the sector. When connected in series, the current supplied to one sector is identical to the current level supplied to all other sectors, regardless of the spacing between electrode plates, the composition of the plates forming the electrodes of the sectors or other factors.

However, the voltage required to maintain the desired amount of current supplied to an arrangement of sectors connected in series in a current driven application of contaminant separation may vary from sector to sector. For example, one sector having an electrode plate spacing configuration where the volume of the cavities between its plates is different from the spacing configuration of another sector will require a different amount of voltage to be provided to each of the sectors to maintain a constant current level. Other examples where a different amount of voltage may be required from sector to sector may occur when the material comprising the electrodes of one sector is dissimilar from that of another sector or the surface area of the electrode plates of one sector differ from that of another sector.

To determine the total voltage required to drive multiple (2) sectors connected in series within a reactor housing, these tests and calculations should be performed.

1) connect two contaminant separation sectors in series to a power supply;
2) measure the voltage (Separation Voltage) required to achieve and maintain a predetermined amount of current (20 amps, for example) at different spacing intervals between the contaminant separation sectors;
3) the Total Voltage Source (Vs) required to drive X contaminant separation sectors connected in series with the spacing interval established in step 2 above will be:

$$Vs = (X \text{ Contaminant Separation Sectors}/2) * (\text{Separation Voltage})$$

Separation voltage is the ratio of two cubic functions, the ratio between the surface area of the electrode plates/the distance between the electrode plates; and the total surface area of the edges of the electrode plates/the distance between the contaminant separation sectors.

For example, contaminant separation sector 201 may be comprised of eighteen plates of aluminum material measuring 8 inches in length, four inches in height and one-fourth of an inch in thickness, evenly spaced one-fourth inch apart from one another. Sector 202 may be comprised of eighteen plates of carbon steel material measuring 8 inches in length, two inches in height and one-fourth of an inch in thickness, evenly spaced one-fourth inch apart from one another. Sector 203 may be comprised of a total of ten plates of 316 stainless steel material measuring 8 inches in length, one inch in height and one-fourth of an inch in thickness, evenly spaced one-half inch apart from one another.

Even though sectors 201 and 202 utilize an identical number of plates having the same length, thickness and spacing, the plates of sector 202 are only half the height of the plates of sector 201. Therefore, the surface area of the plates of sector 202 is one half the surface area of the plates of sector 201, while sector 203 has less than seven times the surface area of sector 201 and less than three and one half times the surface area of sector 202. Further, the materials comprising the plates of each sector differs from the materials utilized in the other sectors. Therefore, each sector will require a different amount of voltage relative to the other sectors to maintain a constant current in array of contaminant separation sectors connected in series.

As the conductivity of a feedstock fluctuates, the voltage requirements for this current driven application of contaminant separation will also vary. As a feed stream becomes more conductive, less voltage will be required to maintain the desired level of current flowing through the sectors of the reactor. However, as a fluid column flowing through a reactor becomes less conductive, more voltage may be required to maintain the constant current flowing through the reactor.

Relatively low current levels may be required to drive the electrodes by connecting the contaminant separation sectors in series. The voltage supplied to each sector may vary based on factors such as spacing between electrode plates, total surface area of the electrodes, composition of the materials forming a sector and the conductivity of the feedstock. Lower amperage levels typically result in a more gradual degradation of sacrificial electrode materials and prolonged treatment life of the contaminant separation sectors due to less heat generation and minimal arching between electrodes.

The substantially coplanar array of contaminant separation sectors 201, 202 and 203 may be arranged within housing 200 to facilitate their extraction for cleaning, inspection and routine maintenance. Simple sealing apparatus utilizing rapid release mechanisms provide a watertight seal for housing 200 to prevent leakage since relatively low pressure is required for a fluid column to flow through the housing. Regular maintenance and cleaning of reactor 200 is greatly simplified by this construction. The operator need only remove the top of reactor 200 to access contaminant separation sectors 201, 202 and 203. Drain valve 208 may be utilized to allow water and debris generated during the periodic cleaning of the housing to flow out of the enclosure and into a collection vessel.

Static mixing apparatus 205 may be disposed within reactor housing 200 to redirect the flow of a feedstock and create turbulence within the feed stream to reduce laminar flow as a fluid column passes through the array of sectors. Further, the parallel electrode plates may be arranged at an angle to the redirection of flow of fluid through the reactor. In certain applications it may be desirable to attach the static mixing apparatus to the contaminant separation sectors to enhance the structural stability of the substantially coplanar array of sectors.

Electrode plates within reactor unit 200 are arranged in a parallel orientation. However, the spacing between the plates, the surface area or the materials comprising the electrodes of one contaminant separation sector may vary from the spacing between the plates, the surface area or the materials comprising the electrodes of other contaminant separation sectors within the reactor housing. The varied spacing, surface area and materials comprising the electrodes of the sectors disposed within housing 200 allow the charged electrodes of each sector to combine the specific treatment characteristics of each sector to provide for treatment of a broad range of contaminants from a variety of fluid columns.

A single power supply drives this arrangement of distinct and diversified electrodes within the reactor of the instant invention and eliminates the deficiency of prior art devices that require selectively trying other reactors having a different plate configurations, opening a reactor and rearranging movable electrode plates or employing a plurality of contaminant separation reactors requiring a plurality of power supplies in an effort to find electrode configurations that allow prior art devices to effectively treat feedstocks of constantly varying composition.

By utilizing a single power supply in concert with contaminant separation sectors having varied plate spacing configurations, surface areas and material compositions, the instant invention provides multiple treatment levels for a variety of feedstocks within a single housing.

Figure 7:
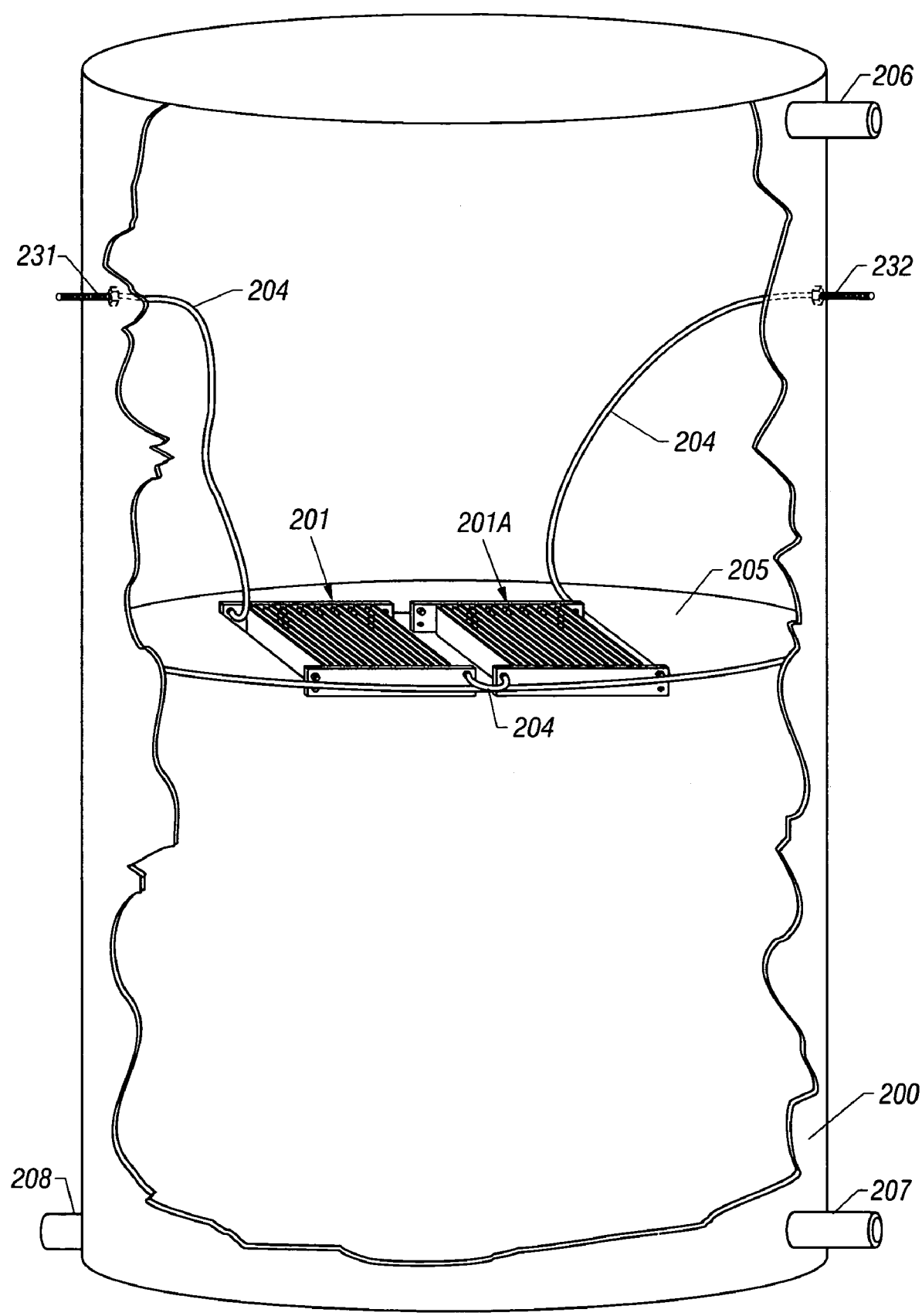
FIG. 7 is a cut-away view of a reactor housing showing a plurality of contaminant separation sectors disposed in a substantially coplanar array in a distinct layer.

FIG. 7 depicts a cut-away view of the third embodiment of the instant invention and shows a plurality of contaminant separation sectors 201 and 201A arranged within the interior chamber of the housing such that the electrodes of the contaminant separation sectors are disposed in a substantially coplanar array in a distinct layer. The plates of the electrodes interleave and form a series of cavities between the facing surfaces of the electrode plates to define a flow path from the inlet port to the outlet port of the housing. Each electrode of a contaminant separation sector is comprised of a plurality of parallel, spaced apart plates coupled to a common buss bar wherein the spacing between the plates is uniform. The individual contaminant separation sectors 201 and 201A are connected in series by electrical jumpers 204 within reactor housing 200, said housing defining an interior chamber established by a fluid impervious boundary wall with an inner surface and having inlet and outlet ports.

The contaminant separation sectors are shown disposed in a substantially coplanar array in a distinct layer within the opening of static mixing apparatus 205. The plates of the opposing electrodes of each sector interleave in a parallel orientation to form a series of cavities of uniform volume provided by the even spacing between the facing surfaces of adjacent plates and define a flow path from the inlet port to the outlet port. Each plate in a sector is energized with an electrical charge opposite from its adjacent plate. Fluid entering reactor housing 200 through inlet port 207 and discharged through outlet port 206 flows through the housing substantially parallel to the facing surfaces of the opposing electrodes so that the fluid flow path extends substantially orthogonal to the direction of the electrical field established between opposing electrode plates. Drain valve 208 may be utilized for cleaning of the housing.

Static mixing apparatus 205 may be attached to the contaminant separation sectors to enhance the structural stability of the substantially coplanar array of sectors and to redirect the flow of a feedstock flowing near the internal wall of the housing to the charged electrodes. Static mixing apparatus may also be utilized to create turbulence within the feed stream and reduces laminar flow as a fluid column passes through the array of sectors. Further, the parallel electrode plates may be arranged at an angle to the redirection of flow of fluid through the reactor.

At least one electric power supply may be coupled to the electrodes to produce an electric field acting within the series of cavities to separate contaminants carried within the fluid column being directed along the flow path. Power supply terminal 231 extending through the side of reactor housing 200 is shown connected to the first electrode of contaminant separation sector 201 via jumper 204. The second electrode of contaminant separation sector 201 is shown connected to the first electrode of contaminant separation sector 201A via jumper 204. The second electrode of contaminant separation sector 201A is shown connected to power supply terminal 232 extending through the side of reactor housing 200 via jumper 204.

In some instances it may be desirable to utilize a first power supply to apply electrical energy to the electrodes of first contaminant separation sector 201 and a second power supply to apply electrical energy to the electrodes of second contaminant separation sector 201A.

Figure 8:
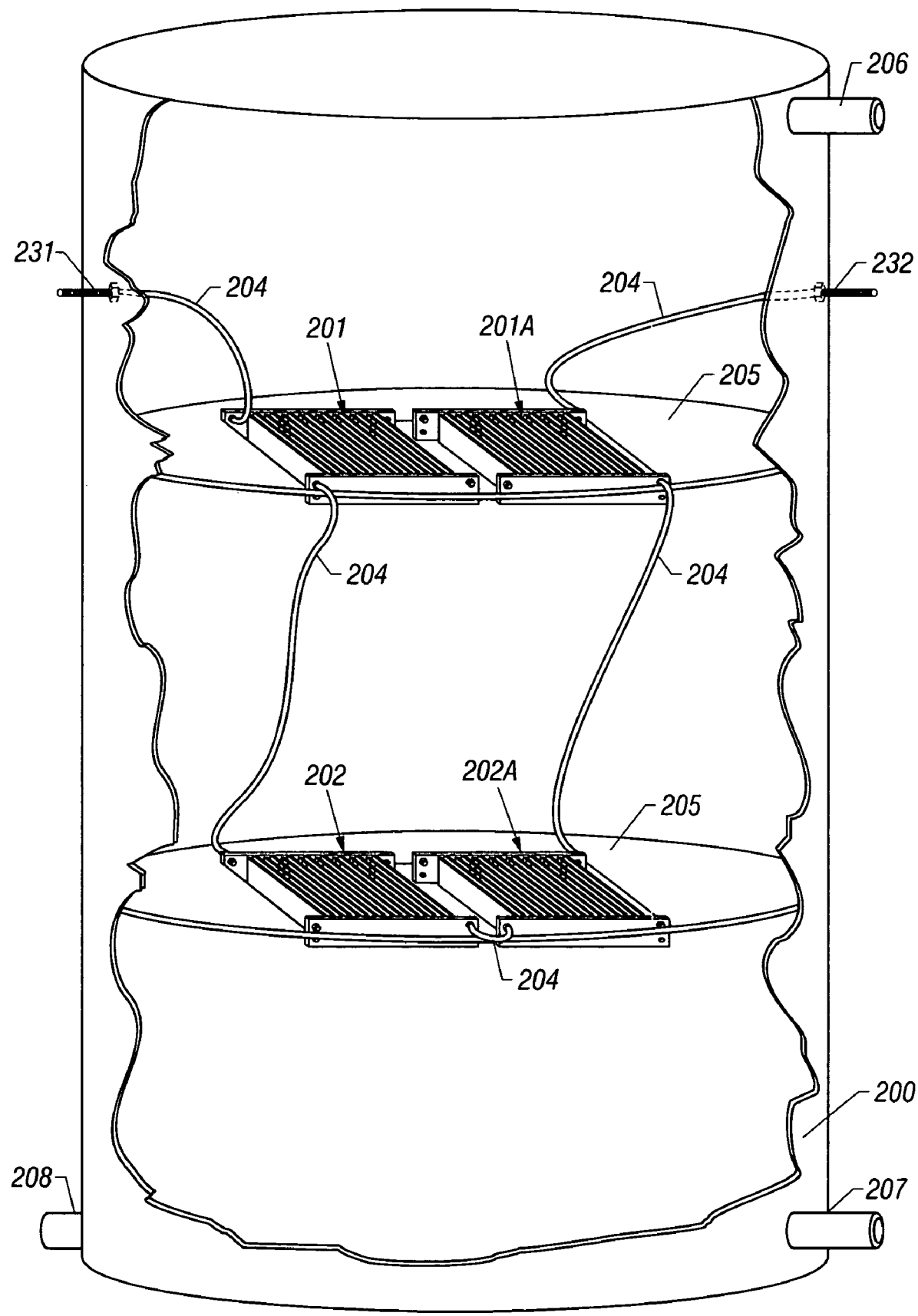
FIG. 8 is a cut-away view of a reactor housing showing a plurality of contaminant separation sectors disposed in a plurality of distinct layers, each layer comprising a plurality of contaminant separation sectors disposed in a substantially coplanar array.

FIG. 8 depicts a cut-away view of the third embodiment of the instant invention and shows a plurality of contaminant separation sectors disposed within the interior chamber of the housing in a plurality of distinct layers, each layer comprising a plurality of contaminant separation sectors within the interior chamber of the housing such that the electrodes of the contaminant separation sectors are disposed in a substantially coplanar array in a distinct layer. Fluid may enter reactor housing 200 through inlet port 207 and be discharged through outlet port 206. Drain valve 208 may be utilized for periodic cleaning of the housing. Contaminant separation sectors 201 and 201A are shown disposed within the interior chamber of the housing in a substantially coplanar array and forming a first layer and contaminant separation sectors 202 and 202A are shown disposed within the interior chamber of the housing in a substantially coplanar array and forming a second layer. Static mixing apparatus 205 is shown attached to each layer comprising a substantially coplanar array of contaminant separation sectors.

Power supply terminal 231 extending through the side of reactor housing 200 is connected to the first electrode of contaminant separation sector 201 via jumper 204. The second electrode of contaminant separation sector 201 is connected to the first electrode of contaminant separation sector 202 via jumper 204. The second electrode of contaminant separation sector 202 is connected to a first electrode of contaminant separation sector 202A via jumper 204. The second electrode of contaminant separation sector 202A is connected is connected to the first electrode of contaminant separation sector 201A via jumper 204. The second electrode of contaminant separation sector 201A is connected to power supply terminal 232 extending through the side of reactor housing 200 via jumper 204.

In some instances it may be desirable to utilize a first power supply to apply electrical energy to the electrodes of the first layer of first contaminant separation sectors 201 and 201A and a second power supply to apply electrical energy to the electrodes of the second layer of second contaminant separation sectors 202 and 202A.

The volume of the cavities between the facing surfaces of the electrode plates of one sector may differ from the volume of the cavities between the facing surfaces of the electrode plates of other sectors in the layered and substantially coplanar array of a plurality of contaminant separation sectors.

Completion fluids, such as brines, bromides and formates, utilized in oil and gas production typically become contaminated with solids, such as clays, oil, suspended metals and other impurities after use in petroleum production. These oilfield treatment fluids are typically filtered to remove contaminants and allow for the reuse of these relatively expensive fluids. However, contaminants that cannot be removed from such fluid columns by current filtration apparatus remain within these completion fluids. The accumulation of these suspended and dissolved pollutants can render a volume of completion fluid unfit for continued reused in petroleum production due to fouling by excessive volumes of these contaminants. The instant invention may be utilized to extend the effective life of completion fluids by extracting dissolved and suspended oilfield pollutants and allow for continued reuse.

The method and apparatus disclosed in the instant invention are best utilized in the treatment of fluid columns having relatively low concentration levels of contaminants. Therefore, pretreatment of a feedstock may be desirable to extract any readily recoverable contaminants from the fluid column. For example, free-floating oil or other petroleum products may be removed from a feed stream through the use of equipment utilizing gravity, skimming, centrifugal, coalescing or other separation methods. Such equipment may be configured to automatically discharge accumulated volumes of separated contaminants to a collection vessel for recycling of the concentrated contaminants. In many instances it may be desirable to direct a relatively small portion of a treated fluid column discharged from a contaminant separation reactor to a holding reservoir or collection vessel to allow the residual effects provided by the instant invention to pretreat accumulated volumes of a candidate feedstock. The addition of an electrochemically treated fluid column to a feed stream awaiting processing typically initiates separation of many contaminants within the collected fluid column and provides for a more thorough bulk separation of contaminants. Thus, residual effects provided to a fluid column treated by the instant invention may be used to pretreat accumulated volumes of a feedstock and enhance the effectiveness of initial bulk separation devices, thereby improving the efficiency of the electrodes in the processing of a pretreated fluid column.

The foregoing description of the preferred embodiment has been for the purpose of explanation and illustration. It will be appreciated by those skilled in the art that modifications and changes may be made without departing from the essence and scope of the present invention. Therefore, it is contemplated that the appended claims will cover any modifications or embodiments that fall within the scope of the invention.

What is claimed is:

1. A method of removing contaminants from a fluid column, comprising the steps of:
   providing a magnetic field generator;
   providing a housing defining an interior chamber established by a fluid impervious boundary wall with an inner surface and having inlet and outlet ports;
   providing a plurality of contaminant separation sectors, each contaminant separation sector comprising a pair of electrodes, each electrode comprising a plurality of parallel, spaced-apart plates coupled to a common buss bar and wherein the spacing between the plates is uniform, the plates of the electrodes interleaving and forming a series of cavities to define a flow path from the inlet port to the outlet port of the housing;
   placing said plurality of contaminant separation sectors within the interior chamber of the housing such that the electrodes of the contaminant separation sectors are disposed in a substantially coplanar array in a distinct layer;
   pretreating the fluid column to facilitate the removal of contaminants;
   passing a feed stream of contaminants carried within the fluid column through the magnetic field generator wherein the magnetic flux provided by the magnetic field generator is introduced to the contaminated fluid column;
   introducing the magnetically treated feed stream of contaminants carried within the fluid column to the inlet port of said housing to establish a flow of the fluid column carrying the contaminants through the housing along the defined flow path;
   applying electrical energy to the electrodes of the contaminant separation sectors to produce an electric field that causes contaminants carried within the magnetically treated feed stream to separate from the fluid column, said contaminants separated from the fluid column bonding into a stable flocculate to facilitate their separation from the fluid column; and
   discharging as a processed feed stream the fluid exiting from the outlet port of the interior chamber of the housing.

2. The method of claim 1 further comprising the steps of:
   directing the treated fluid column to a separation apparatus to remove the flocculate;
   discharging the treated fluid column exiting from the separation apparatus as a processed feed stream for additional service or discharge into the environment;
   replacing the electrodes; and
   disposing of the separated contaminants.

3. The method of claim 1 wherein the magnetically treated feed stream flows through a plurality of contaminant separation sectors disposed within the interior chamber of the housing in a plurality of distinct layers, each layer comprising a plurality of contaminant separation sectors within the interior chamber of the housing such that the electrodes of the contaminant separation sectors are disposed in a substantially coplanar array in a distinct layer.

4. An apparatus for removing contaminants from a fluid column, comprising:
   a magnetic field generator;
   a housing defining an interior chamber established by a fluid impervious boundary wall with an inner surface and having inlet and outlet ports;
   first and second contaminant separation sectors mounted within the interior chamber of the housing, each contaminant separation sector comprising a pair of electrodes, each electrode comprising a plurality of parallel, spaced-apart plates coupled to a common buss bar and wherein the spacing between the plates of each contaminant separation sector is uniform;
   said first and second contaminant separation sectors being arranged within the interior chamber of the housing such that the electrodes of the contaminant separation sectors are disposed in a substantially coplanar array in a distinct layer, the plates of the electrodes interleaving and forming a series of cavities between the facing surfaces of the electrode plates to define a flow path from the inlet port to the outlet port of the housing;

at least one electric power supply coupled to the electrodes to produce an electric field acting within the series of cavities to separate contaminants carried within the fluid column being directed along the flow path; and a separation apparatus to remove the separated contaminants from the fluid column.

5. The apparatus of claim 4 wherein a plurality of contaminant separation sectors are disposed within the interior chamber of the housing in a plurality of distinct layers, each layer comprising a plurality of contaminant separation sectors within the interior chamber of the housing such that the electrodes of the contaminant separation sectors are disposed in a substantially coplanar array in a distinct layer.

6. The apparatus of claim 4 wherein the volume of the cavities between the electrode plates of the first contaminant separation sector differs from the volume of the cavities between the electrode plates of the second contaminant separation sector.

7. The apparatus of claim 4 wherein the fluid flow path extends substantially parallel to the surface of each electrode plate.

8. The apparatus of claim 4 wherein the electrodes comprise an electrically conductive material.

9. The apparatus of claim 8 wherein the electrically conductive material comprising the electrode plates of the first contaminant separation sector differs from the electrically conductive material comprising the electrode plates of the second contaminant separation sector.

10. The apparatus of claim 4 wherein the fluid flow path extends substantially orthogonal to the direction of the electrical field that is established between opposing electrode plates.

11. The apparatus of claim 4 wherein the at least one electrical power supply comprises a direct current source having first and second electrical terminal connections, each terminal connection being coupled to a buss bar of an electrode.

12. The apparatus of claim 11 wherein the contaminant separation sectors are connected in series to the electrical power supply.

13. The apparatus of claim 11 wherein the contaminant separation sectors are connected in parallel to the electrical power supply.

14. The apparatus of claim 4 wherein a first power supply applies electrical energy to the electrodes of a first contaminant separation sector and a second power supply applies electrical energy to the electrodes of a second contaminant separation sector.

15. The apparatus of claim 4 wherein static mixing apparatus placed within the housing disrupt the laminar flow of a fluid column passing between the electrodes.

16. The apparatus of claim 4 wherein static mixing apparatus redirect a feedstock flowing near the internal wall of the housing to the charged electrodes.

17. The apparatus of claim 4 wherein the electrode plates are arranged at an angle to the direction of flow of a feed stream through the housing to disrupt laminar flow and increase turbulence within a housing.

18. A method of removing contaminants from a fluid column, comprising:

pretreating the fluid column to facilitate the removal of contaminants;

establishing a flow of the fluid to be treated along a path extending through:

(a) a magnetic field generator;

(b) a housing downstream of the magnetic field generator, said housing defining an interior chamber established by a fluid impervious boundary wall with an inner surface and having inlet and outlet ports downstream of the magnetic field generator, said housing having a plurality of contaminant separation sectors disposed in a substantially coplanar array to form a distinct layer within the interior chamber of the housing, each contaminant separation sector comprising a pair of electrodes, each electrode comprising a plurality of parallel, spaced-apart plates coupled to a common buss bar, the electrode plates interleaving and forming a series of cavities between the facing surfaces of the electrode plates wherein their spacing is uniform and defines a flow path from the inlet port of the housing to the outlet port of the housing; and (c) a separation apparatus downstream of the housing;

establishing magnetic flux provided by the magnetic field generator;

establishing an electric field produced by applying electrical energy to the electrodes of the contaminant separation sectors to cause contaminants to separate from the fluid column and bond into a stable flocculate that facilitates their separation from the fluid column; and establishing the separation of the flocculate from the fluid column by the separation device.

19. The method of claim 18 wherein the fluid to be treated flows through a plurality of contaminant separation sectors disposed within the interior chamber of the housing in a plurality of distinct layers, each layer comprising a plurality of contaminant separation sectors within the interior chamber of the housing such that the electrodes of the contaminant separation sectors are disposed in a substantially coplanar array to form a distinct layer.

20. An apparatus for removing contaminants from a fluid column comprising:

a magnetic field generator to receive a flow of the fluid to be treated, said magnetic field generator establishing magnetic flux introduced to the contaminated fluid column;

a housing to receive the flow of the fluid to be treated, said housing defining an interior chamber established by a fluid impervious boundary wall with an inner surface and having inlet and outlet ports;

first and second contaminant separation sectors disposed in a substantially coplanar array to form a distinct layer within the interior chamber of the housing, each contaminant separation sector comprising a pair of electrodes, each electrode comprising a plurality of parallel, spaced-apart plates coupled to a common buss bar, the electrode plates interleaving and forming a series of cavities between the facing surfaces of the electrode plates wherein their spacing is uniform and defines a flow path from the inlet port of the housing to the outlet port of the housing, the electrodes establishing an electric field directed along the flow path of the fluid within the series of cavities between plates;

at least one electrical power supply coupled to the electrodes establishing a supply of electrical power to energize the contaminant separation sectors; and a separation apparatus to receive the flow of the fluid to be treated, said separation device establishing an apparatus for removing the separated contaminants from the fluid column.

21. The apparatus of claim 20 wherein a plurality of contaminant separation sectors are disposed within the interior chamber of the housing in a plurality of distinct layers, each layer comprising a plurality of contaminant separation sectors within the interior chamber of the housing such that the electrodes of the contaminant separation sectors are disposed in a substantially coplanar array to form a distinct layer.

* * * * *